(12) United States Patent
Adams et al.

(10) Patent No.: US 7,509,923 B2
(45) Date of Patent: Mar. 31, 2009

(54) LIVESTOCK SORTING FACILITY

(75) Inventors: William R. Adams, Broken Bow, NE (US); Jerry D. Adams, Broken Bow, NE (US)

(73) Assignee: Adams Land & Cattle Company, Broken Bow, NE (US)

( * ) Notice: Subject to any disclaimer, the term of this patent is extended or adjusted under 35 U.S.C. 154(b) by 0 days.

(21) Appl. No.: 11/904,096

(22) Filed: Sep. 26, 2007

(65) Prior Publication Data

US 2008/0017126 A1    Jan. 24, 2008

Related U.S. Application Data

(62) Division of application No. 11/135,616, filed on May 23, 2005.

(60) Provisional application No. 60/637,297, filed on Dec. 17, 2004.

(51) Int. Cl.
*A01K 29/00* (2006.01)
(52) U.S. Cl. ........................ 119/415; 119/843
(58) Field of Classification Search ................ 119/415, 119/843, 400, 437, 840, 844, 845, 846
See application file for complete search history.

(56) References Cited

U.S. PATENT DOCUMENTS

| | | | | |
|---|---|---|---|---|
| 2,818,954 | A * | 1/1958 | Vice | 193/35 C |
| 3,167,192 | A | 1/1965 | Harrison et al. | |
| 3,633,963 | A * | 1/1972 | Haynes | 296/24.31 |
| 3,718,120 | A * | 2/1973 | Schwarz et al. | 119/421 |
| 3,867,903 | A * | 2/1975 | Fleshman | 119/455 |
| 3,942,476 | A * | 3/1976 | Napier | 119/437 |
| 4,167,152 | A * | 9/1979 | Mills | 119/416 |
| 4,168,933 | A * | 9/1979 | Kane | 414/498 |
| 4,275,685 | A | 6/1981 | Hopkins | |
| 4,321,889 | A * | 3/1982 | Michaelsen et al. | 119/846 |
| 4,530,538 | A * | 7/1985 | Greene et al. | 296/24.31 |
| 4,733,971 | A | 3/1988 | Pratt | |
| 4,815,042 | A | 3/1989 | Pratt | |
| 4,889,433 | A | 12/1989 | Pratt | |
| 4,910,024 | A | 3/1990 | Pratt | |
| 5,008,821 | A | 4/1991 | Pratt et al. | |
| 5,219,224 | A | 6/1993 | Pratt | |
| 5,315,505 | A | 5/1994 | Pratt et al. | |

(Continued)

FOREIGN PATENT DOCUMENTS

JP    05-268851    10/1993

(Continued)

*Primary Examiner*—Yvonne R. Abbott
(74) *Attorney, Agent, or Firm*—Suiter Swantz pc llo

(57) ABSTRACT

A system and method for the sorting of livestock including a livestock processing station, a computer network system, and a trolley system. The livestock processing station confines the individual livestock, allowing individual livestock data to be collected and analyzed. The computer network system includes a first computer for data input at the livestock processing station and a second computer coupled to the first computer via a computer network, the second computer for storing and analyzing individual livestock data and assigning livestock to pens. The trolley system is controlled by the computer network system for transporting livestock from the livestock processing station to the assigned livestock pen. Such system includes a plurality of trolley cars for containing livestock and a conveyor system coupled to the plurality of trolley cars for transporting livestock to the assign livestock pen.

3 Claims, 17 Drawing Sheets

U.S. PATENT DOCUMENTS

| | | | |
|---|---|---|---|
| 5,340,211 | A | 8/1994 | Pratt |
| RE34,776 | E | 11/1994 | Pratt |
| 5,369,032 | A | 11/1994 | Pratt |
| 5,401,501 | A | 3/1995 | Pratt |
| 5,573,002 | A | 11/1996 | Pratt |
| 5,673,647 | A | 10/1997 | Pratt |
| 5,803,906 | A | 9/1998 | Pratt et al. |
| 5,836,880 | A | 11/1998 | Pratt |
| 5,852,989 | A * | 12/1998 | Fuchs ............... 119/843 |
| 5,863,174 | A * | 1/1999 | Mola ............... 414/505 |
| 6,000,361 | A | 12/1999 | Pratt |
| 6,109,215 | A | 8/2000 | Jerome |
| 6,131,744 | A | 10/2000 | Pratt |
| 6,135,055 | A | 10/2000 | Pratt |
| 6,175,052 | B1 | 1/2001 | Wijn et al. |
| 6,200,210 | B1 | 3/2001 | Pratt |
| 6,209,492 | B1 * | 4/2001 | Rankin ............... 119/843 |
| 6,318,289 | B1 | 11/2001 | Pratt |
| 6,447,234 | B2 * | 9/2002 | Sinn et al. ............... 414/398 |
| 6,454,510 | B1 * | 9/2002 | Sinn et al. ............... 414/393 |
| 6,477,987 | B2 * | 11/2002 | Taylor ............... 119/843 |
| 6,516,746 | B2 | 2/2003 | Pratt |
| 6,526,919 | B1 | 3/2003 | Schick |
| 6,539,896 | B1 | 4/2003 | Larsen |
| 6,547,726 | B2 | 4/2003 | Pratt et al. |
| 6,579,236 | B2 | 6/2003 | Pratt |
| 6,592,517 | B2 | 7/2003 | Pratt et al. |
| 6,623,232 | B2 | 9/2003 | Cattaruzzi |
| 6,659,039 | B1 | 12/2003 | Larsen |
| 6,698,812 | B1 * | 3/2004 | Stubbs ............... 296/24.31 |
| 6,736,272 | B2 | 5/2004 | Pratt |
| 6,805,075 | B2 | 10/2004 | Pratt |
| 6,810,832 | B2 * | 11/2004 | Ford ............... 119/437 |
| 7,216,605 | B2 * | 5/2007 | Cupps ............... 119/412 |
| 2001/0016681 | A1 | 8/2001 | Pratt et al. |
| 2001/0044579 | A1 | 11/2001 | Pratt |
| 2002/0050248 | A1 | 5/2002 | Pratt |
| 2002/0056669 | A1 | 5/2002 | Pratt |
| 2002/0115915 | A1 | 8/2002 | Pratt et al. |
| 2003/0188689 | A1 | 10/2003 | Pratt |
| 2004/0103847 | A1 | 6/2004 | Larsen |
| 2004/0123811 | A1 * | 7/2004 | Bonsall ............... 119/843 |
| 2006/0130777 | A1 | 6/2006 | Adams et al. |

FOREIGN PATENT DOCUMENTS

| | | |
|---|---|---|
| WO | PCT/DE87/00051 | 8/1987 |

* cited by examiner

LIVESTOCK SORTING FACILITY

CROSS REFERENCE TO RELATED APPLICATIONS

The present application is a divisional application claiming the benefit under 35 U.S.C. §120 of U.S. patent application Ser. No. 11/135,616, filed May 23, 2005, which claims the benefit under 35 U.S.C. § 119(e) of U.S. Provisional Patent Application Ser. No. 60/637,297, filed Dec. 17, 2004, all of which are herein incorporated by reference in their entirety.

FIELD OF THE INVENTION

The present invention generally relates to the field of management of livestock in a feedlot, and more particularly to a system and method of sorting livestock at a feedlot for optimum beef quality and maximum economic return to the feedlot and producer.

BACKGROUND OF THE INVENTION

Large feedlots which are utilized by cattle producers (e.g. ranchers) to improve cattle condition prior to rendering are faced with the problem of caring for a cattle population that may be extremely diverse. Both genetic as well as environmental factors contribute to the tremendously diverse cattle population within a given feedlot. Such diversity has greatly increased the complexity of large feedlots, because if a feedlot and producer desire to produce quality meat at the lowest possible cost for the maximum economic return, the individual needs of each animal must be assessed (e.g., the measuring and tracking of physical as well as other performance characteristics of each cow during their period at the feedlot). If such individuality is not addressed, the cost to produce quality meat may increase significantly while possibly reducing the maximum economic return to the feedlot and producer.

Many different systems and methods are presently available to address the need of effectively measuring and sorting animals individually. The majority of such systems and methods rely upon computer monitoring systems to monitor livestock development and activities. Although existing feedlot management methods and systems allow for the monitoring of desired livestock activities and development, inefficiency is still present within such methods and systems under certain conditions. For instance, while the monitoring of desired livestock parameters has been automated, current systems and methods still rely on manual movement of livestock throughout the sorting facility. As such, the current methods and systems are extremely labor intensive, inefficient, and even possibly injurious to animals.

Therefore, it would be desirable to create a system and method for the sorting or processing of livestock to overcome the above mentioned limitations of manual movement of livestock throughout the sorting facility thereby increasing the efficiency of such activities.

SUMMARY OF THE INVENTION

Accordingly, the present invention is an automated system and method for sorting or processing of livestock. In accordance with a first aspect of the present invention, an automated system for the sorting of livestock is disclosed. In an exemplary embodiment, the automated sorting system includes a livestock processing station, a computer network system, and a trolley system. The livestock processing station confines the individual livestock, allowing individual livestock data to be collected and analyzed. The computer network system includes a first computer for data input at the livestock processing station and a second computer coupled to the first computer via a computer network. The second computer stores and analyzes individual livestock data and assignment of livestock to pens. Additionally, the trolley system is controlled by the computer network system and transports livestock from the livestock processing station to the assigned livestock pen. The trolley system includes a plurality of trolley cars for containing livestock and a conveyor system coupled to the plurality of trolley cars for transporting livestock to the assigned livestock pen. Use of the computer network system and trolley system yields an integrated, efficient system for the sorting of livestock.

In accordance with a further aspect of the present invention, a method for sorting of livestock is disclosed. In an exemplary embodiment, the sorting method includes the confining of individual livestock to a processing station to collect individual livestock data, storing and analyzing individual livestock data on a computer network system, and transporting livestock from the processing station to the assigned livestock pen by a trolley system. In such an embodiment, the computer network system includes a first computer for data input at the livestock processing station and a second computer coupled to the first computer via a computer network. The second computer stores and analyzes individual livestock data as well as assigns livestock to specific pens. The trolley system is controlled by the computer network system and includes a plurality of trolley cars for containing livestock and a conveyor system coupled to the plurality of trolley cars for transporting livestock to the assign livestock pen.

It is to be understood that both the foregoing general description and the following detailed description are exemplary and explanatory only. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
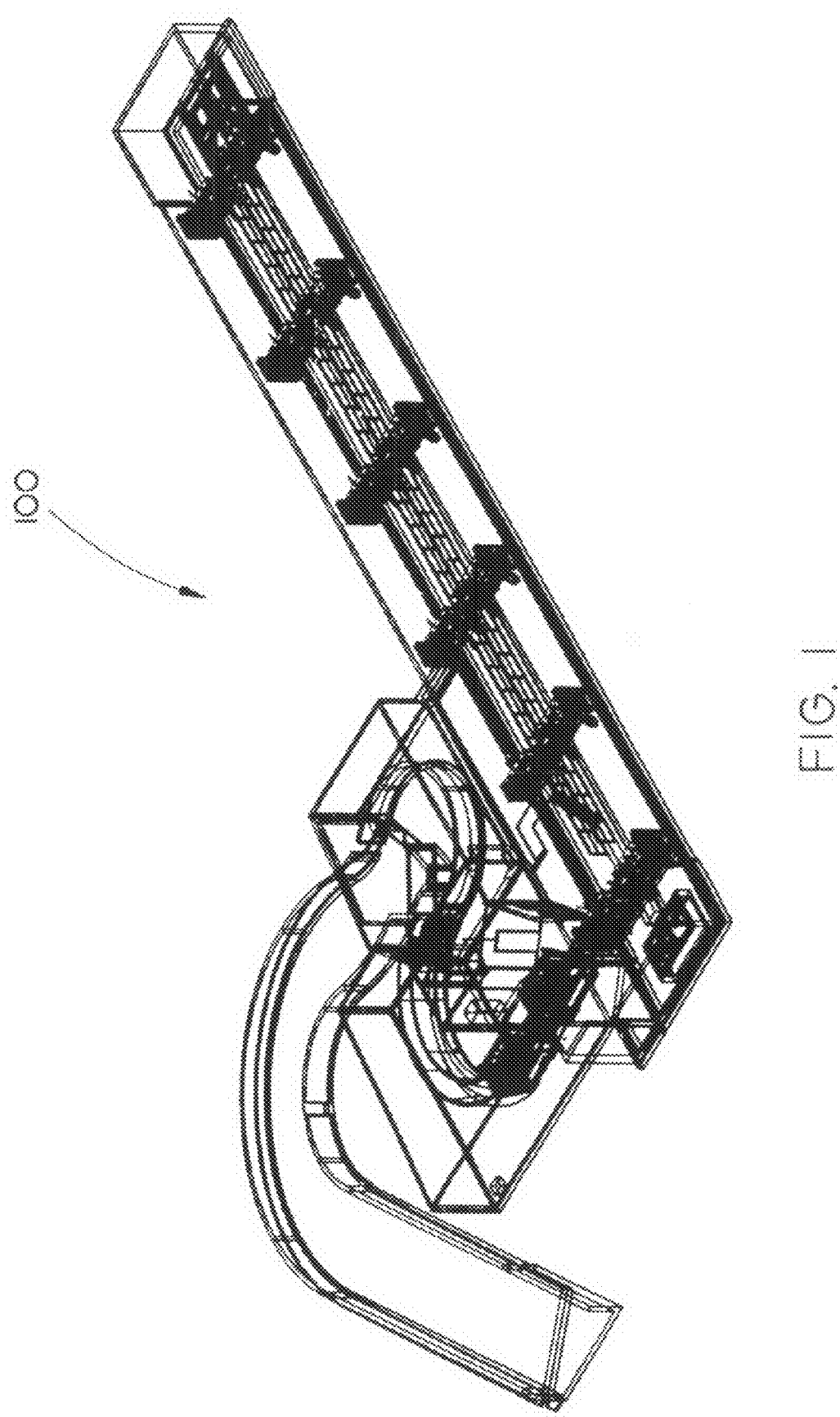
FIG. 1 is an isometric view of a sorting facility in accordance with an exemplary embodiment of the present invention, wherein an overview of the facility is provided.
Figure 2:
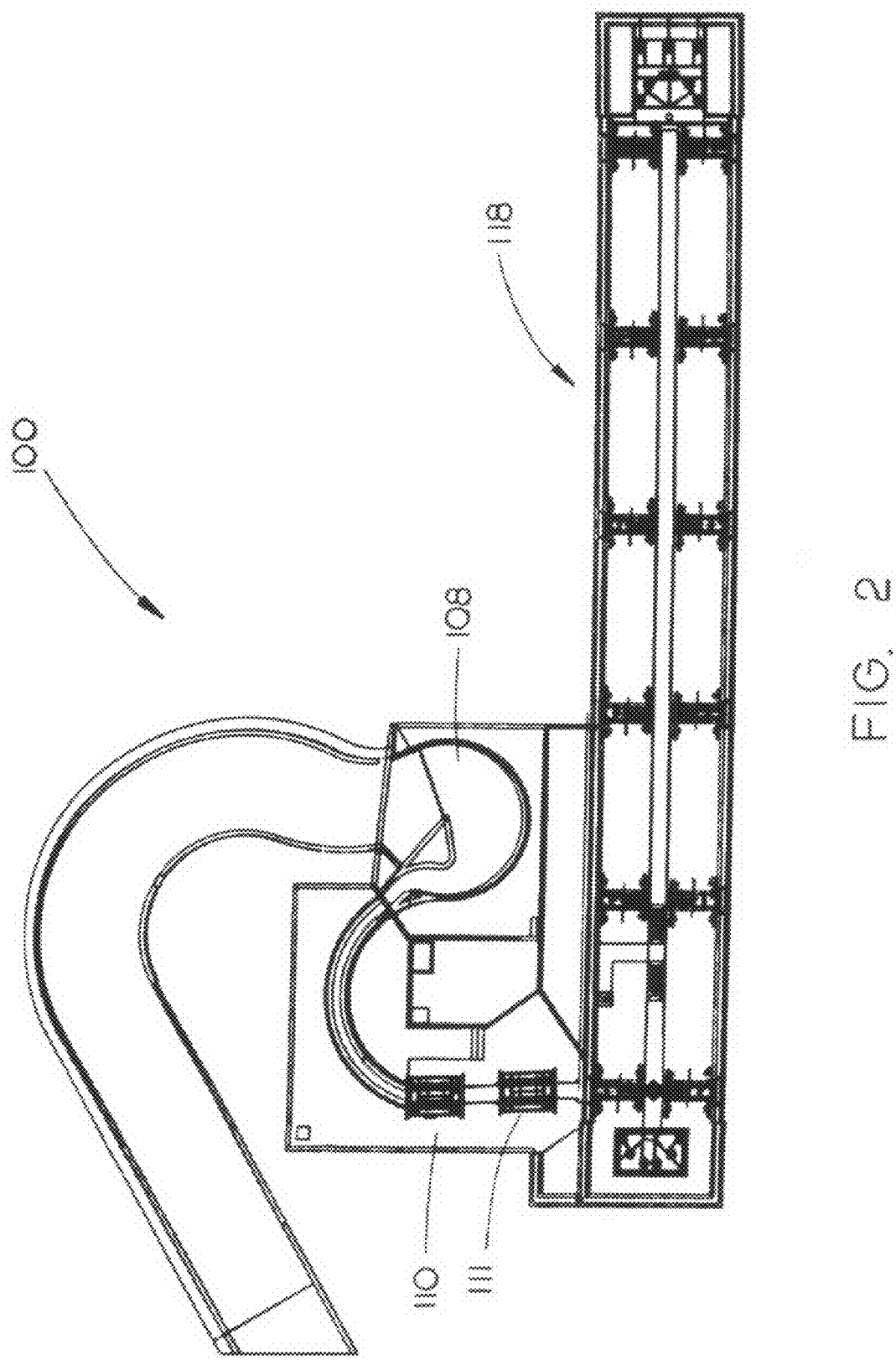
FIG. 2 is a top plan view of the sorting facility illustrated in FIG. 1.
Figure 3:
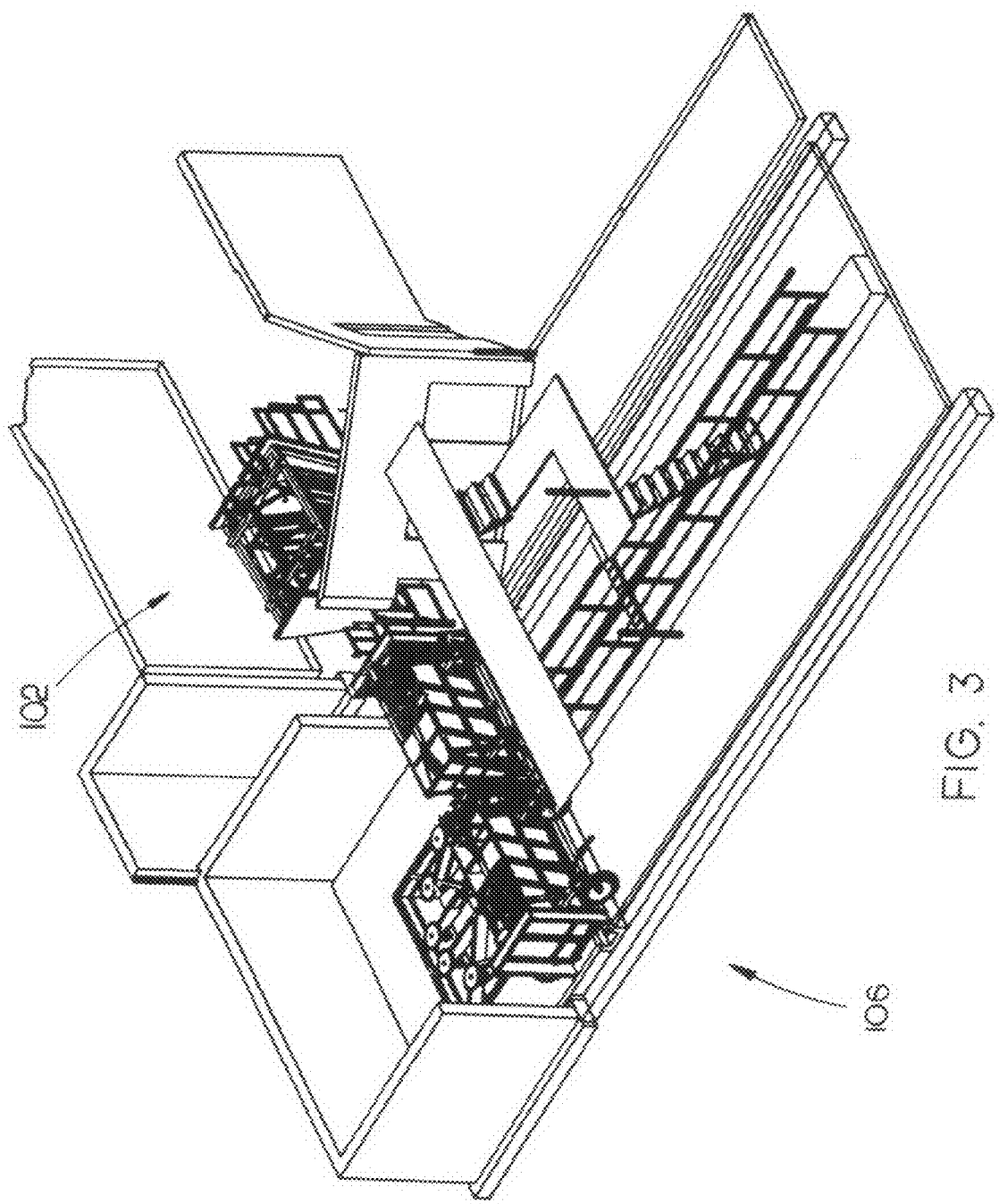
FIG. 3. is a partial isometric view of the sorting facility illustrated in FIG. 1, wherein a trolley system, a holding station, and a conveyor system are provided.
Figure 4:
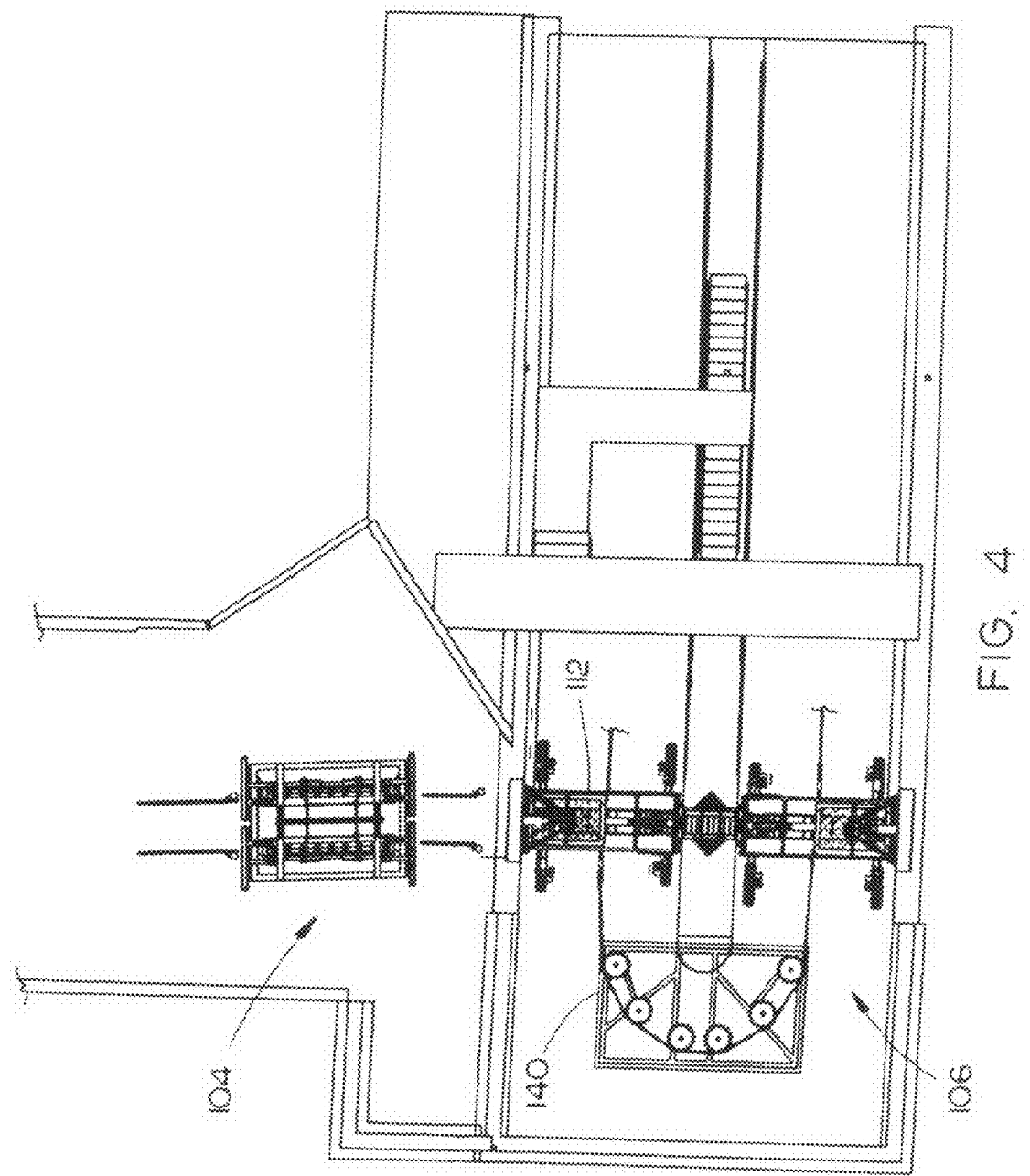
FIG. 4 is a top plan view of the trolley system, the holding station, and the conveyor system illustrated in FIG. 3.
Figure 5:
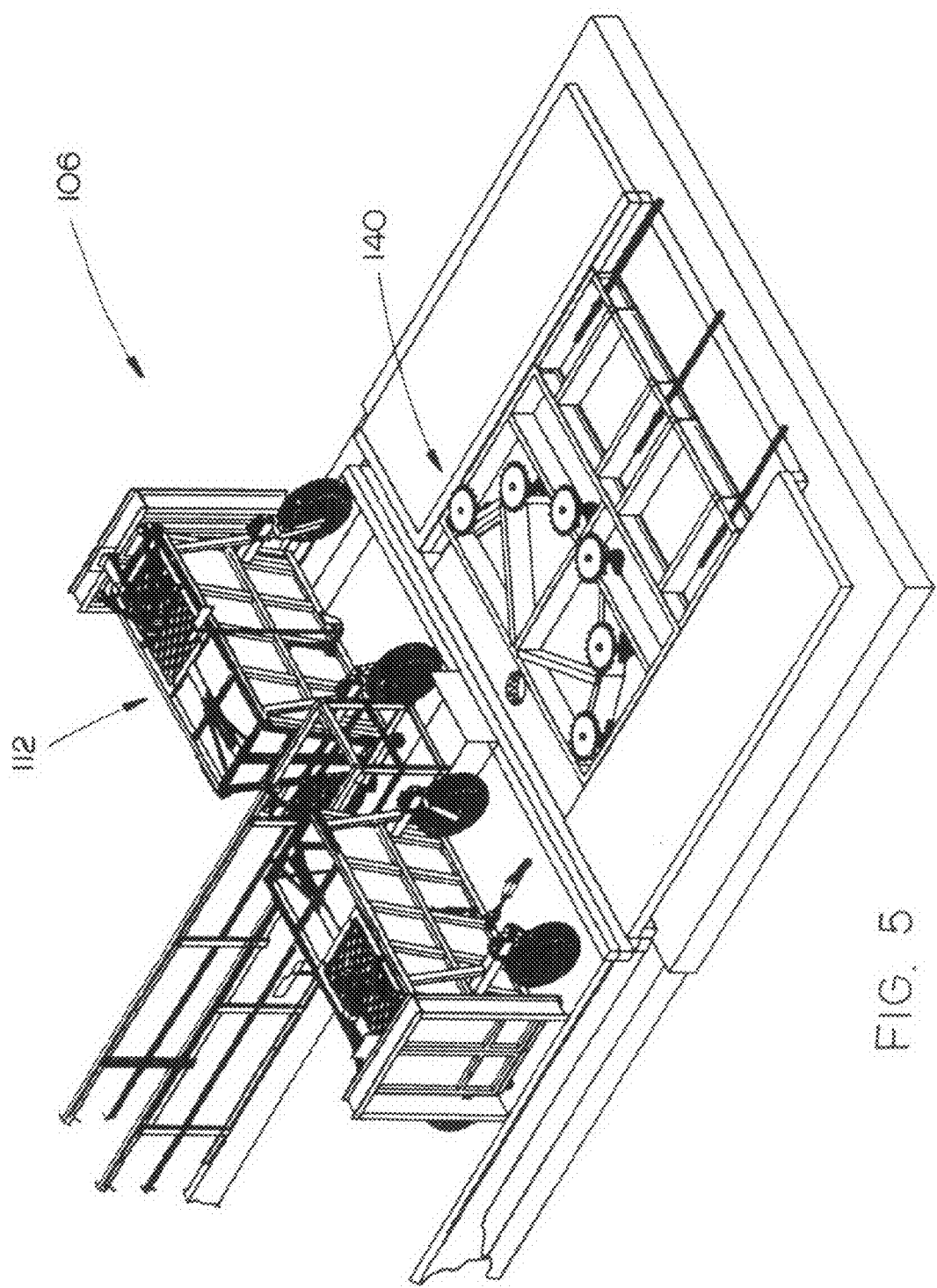
FIG. 5 is an isometric view of a trolley system in accordance with the present invention, wherein the trolley system includes a conveyor system.

Referring specifically to FIGS. 1 and 2, a sorting facility 100 in accordance with the present invention is provided in which the facility 100 includes a livestock processing station 102, a computer network system, and a trolley system 106. The livestock processing station 102 includes a holding area 108 where livestock are held until being processed or sorted. Further, the livestock processing station 102 includes at least one livestock processing station chute. In an exemplary embodiment, as illustrated in FIG. 2, two livestock processing station chutes 110 and 111 are present which function as a confinement area in which a single animal is confined while various external dimensions and characteristics of that animal are measured and recorded. For instance, at the appropriate time, an animal may enter into the chute and a recorder may then measure the animal's weight, hip-height, and thickness. Such data allows individual animal weight gain as well as other specific animal attributes to be tracked over a period of time. It is contemplated that additional procedures may be performed while the animal is confined within the livestock processing station chute including administering appropriate vaccines and antimicrobials without departing from the scope and spirit of the present invention.

In further exemplary embodiments, a computer network system is employed to monitor and analyze individual livestock data. Such system includes a first computer for data input at the livestock processing station 102 and a second computer coupled to the first computer via a computer network, the second computer stores and analyzes individual livestock data as well as assigns livestock to specific pens based upon data analysis. Further, the trolley system 106 is controlled by the computer network system whereby such computer network system determines which gate/pen the trolley system 106 is to transport a specific animal.

Referring to FIGS. 3 through 13, various components and features of the trolley system 106 are described. In one exemplary embodiment, the trolley system 106 includes at least one trolley car 112 and a conveyor system 114 coupled to the trolley car 112 thereby allowing livestock to be transported to specifically assigned livestock pens. Each trolley car 112 includes a support surface 113 constructed to support and transport a single animal. Further, a plurality of side supports extend from the support surface 113 in order to confine the animal within the area defined by the support surface 113. Further, the side supports may be configured to open and shut.

Figure 7:
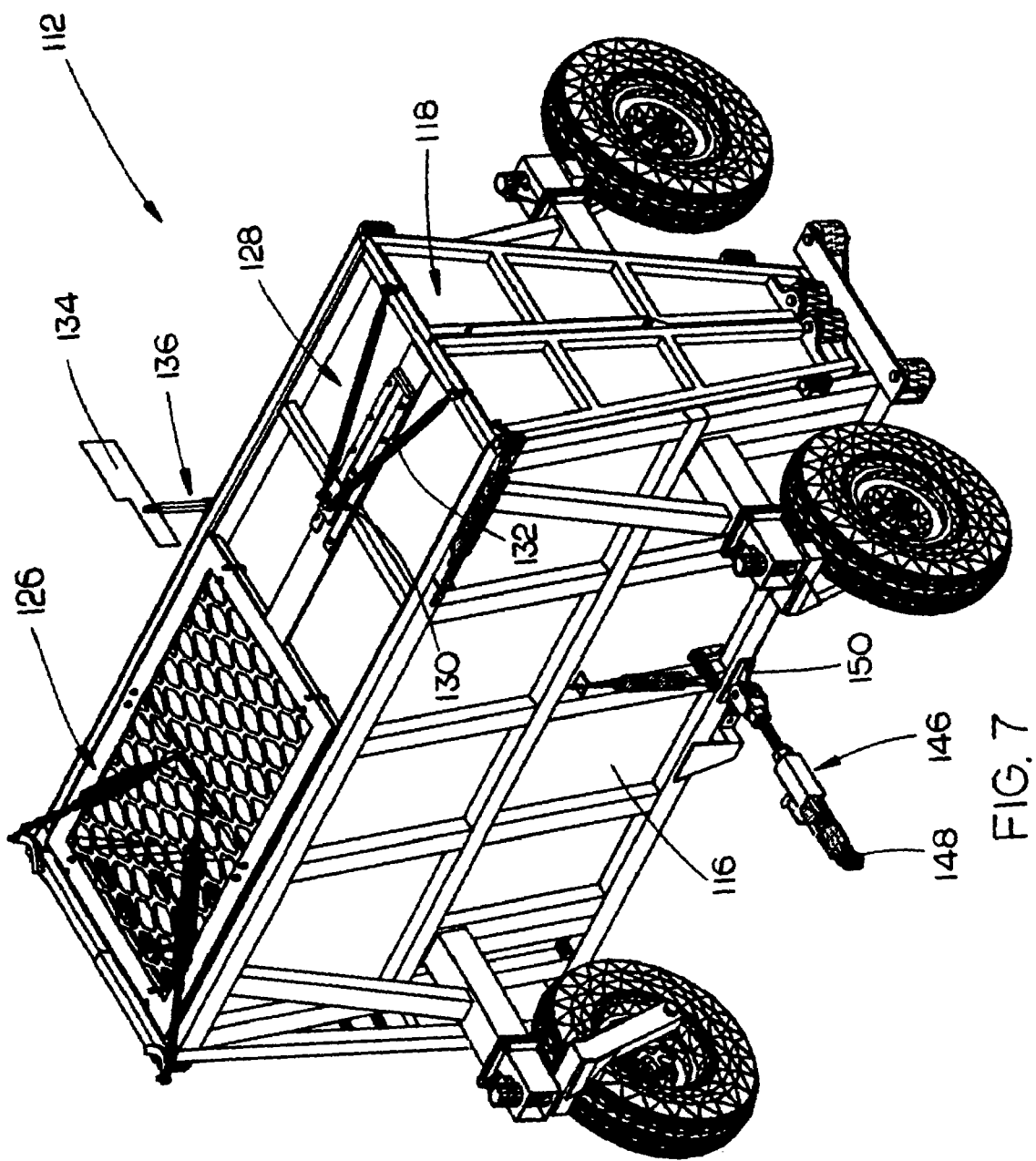
FIG. 7 is an isometric view of a trolley in accordance with the present invention, wherein a mechanical coupling device for coupling the trolley to the conveyor system is illustrated.
Figure 8:
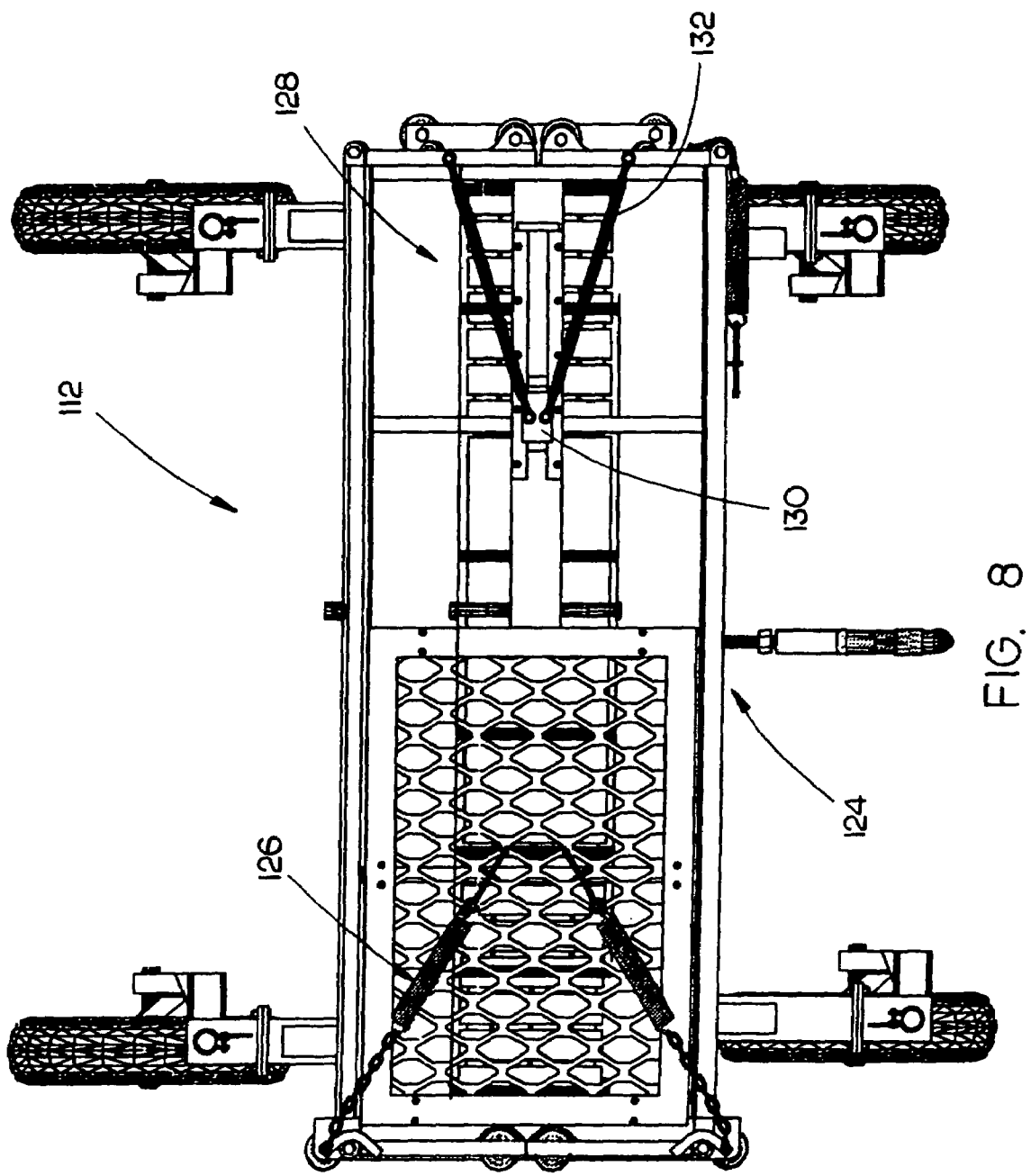
FIG. 8 is a top plan view of the trolley illustrated in FIG. 7.
Figure 9:
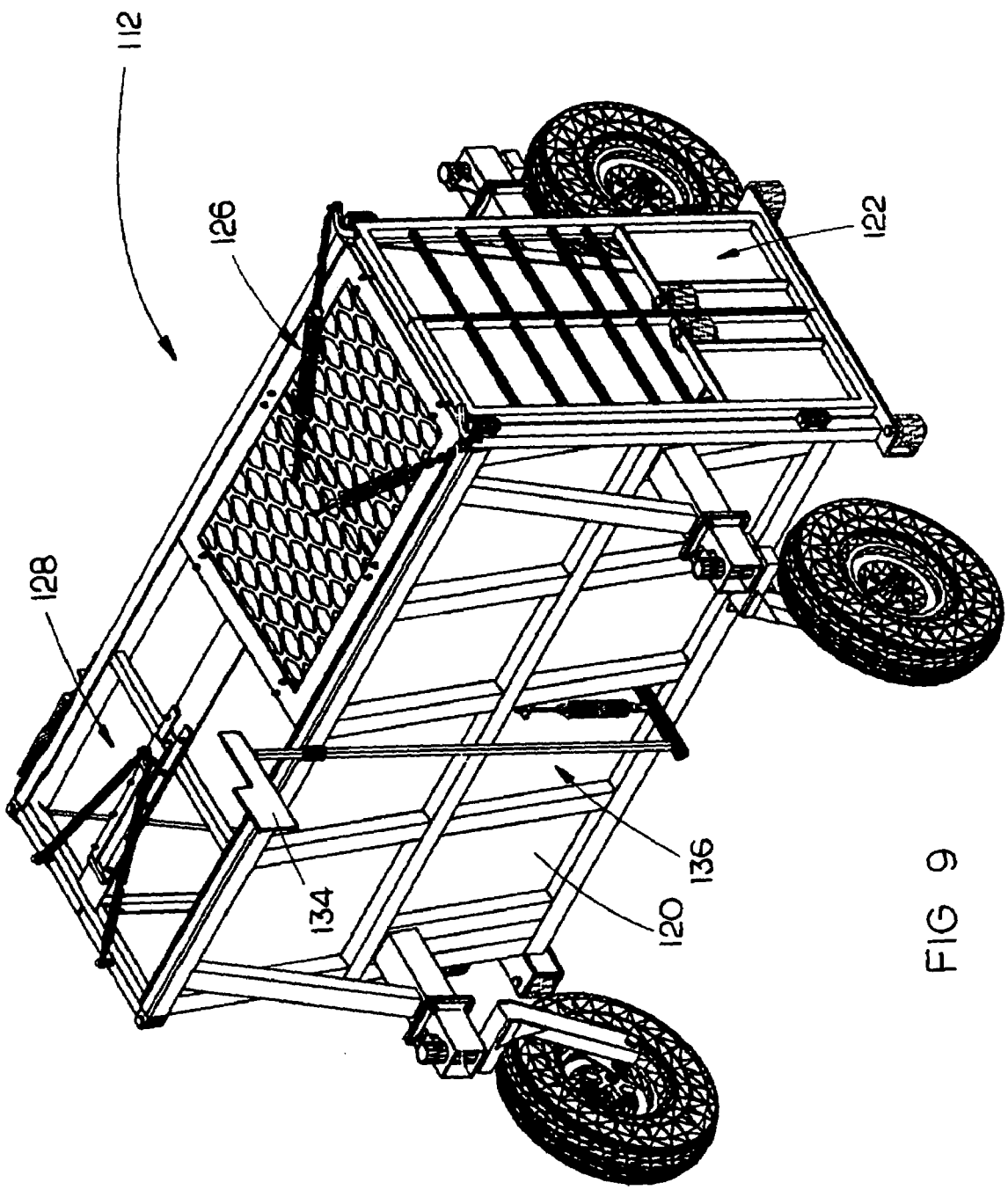
FIG. 9 is an isometric view of a trolley in accordance with the present invention, wherein an indicator for indicating that the trolley is loaded or unloaded is provided.

In an exemplary embodiment, the trolley car 112 includes four side supports: side support 116, side support 118, side support 120, and side support 122 (See FIGS. 7 and 9). In such embodiment, side support 118 and side support 122 are designed to function as doors capable of opening and shutting. Further, as illustrated in FIG. 8, a top assembly 124 is coupled to the side supports. The top assembly 124 includes wire mesh extending at least half the length of such assembly 124 in order to provide a cover over the contained animal.

In further exemplary embodiments, as illustrated in FIGS. 7, 8 and 9, a first mechanical connector assembly 126 is coupled to the wire mesh of the top assembly 124 and controls the opening and shutting of the doors comprising side support 122. Moreover, a second linkage system 128 is coupled to the top assembly 124 and controls the opening and shutting of the doors forming side support 118. In the embodiment, the first mechanical connector assembly 126 includes one compression spring coupled to each door of the side support 122. In contrast, the linkage system 128 includes a slide actuator 130 connected to two rods 132 each of which is coupled to an individual door forming side support 118. It is contemplated that various devices may be employed to allow the doors forming the respective side supports to open and close including hinges, latches, hydraulic actuators, and the like.

In additional exemplary embodiments, the doors forming side support 118, as illustrated in FIG. 7, are shaped to align with a walkway included within a transition area in the sorting facility allowing an enclosed walkway to be formed and for the animal to remain isolated during trolley transfer (as explained in greater detail below). Moreover, the doors forming side support 122, as illustrated in FIG. 9, are shaped to align with a rectangular-shaped standard doorway (e.g. the doorway leading out into a livestock pen).

In further additional exemplary embodiment, as illustrated in FIG. 9, the trolley car 112 includes an indicator system for indicating that the car 112 is empty or loaded. In one embodiment, the indication system includes a flag 134 attached to a spring-loaded rod assembly 136 which moves up and down depending upon livestock weight. For example, when the trolley car 112 is empty the flag 134 is located at a first position. Once an animal steps into the car 112, the flag 134 moves to a second position. Use of the indication system allows an operator to easily track which trolley cars are loaded and which are empty. It is contemplated that additional demarcation devices may be employed including lights without departing from the scope and spirit of the present invention.

Figure 6:
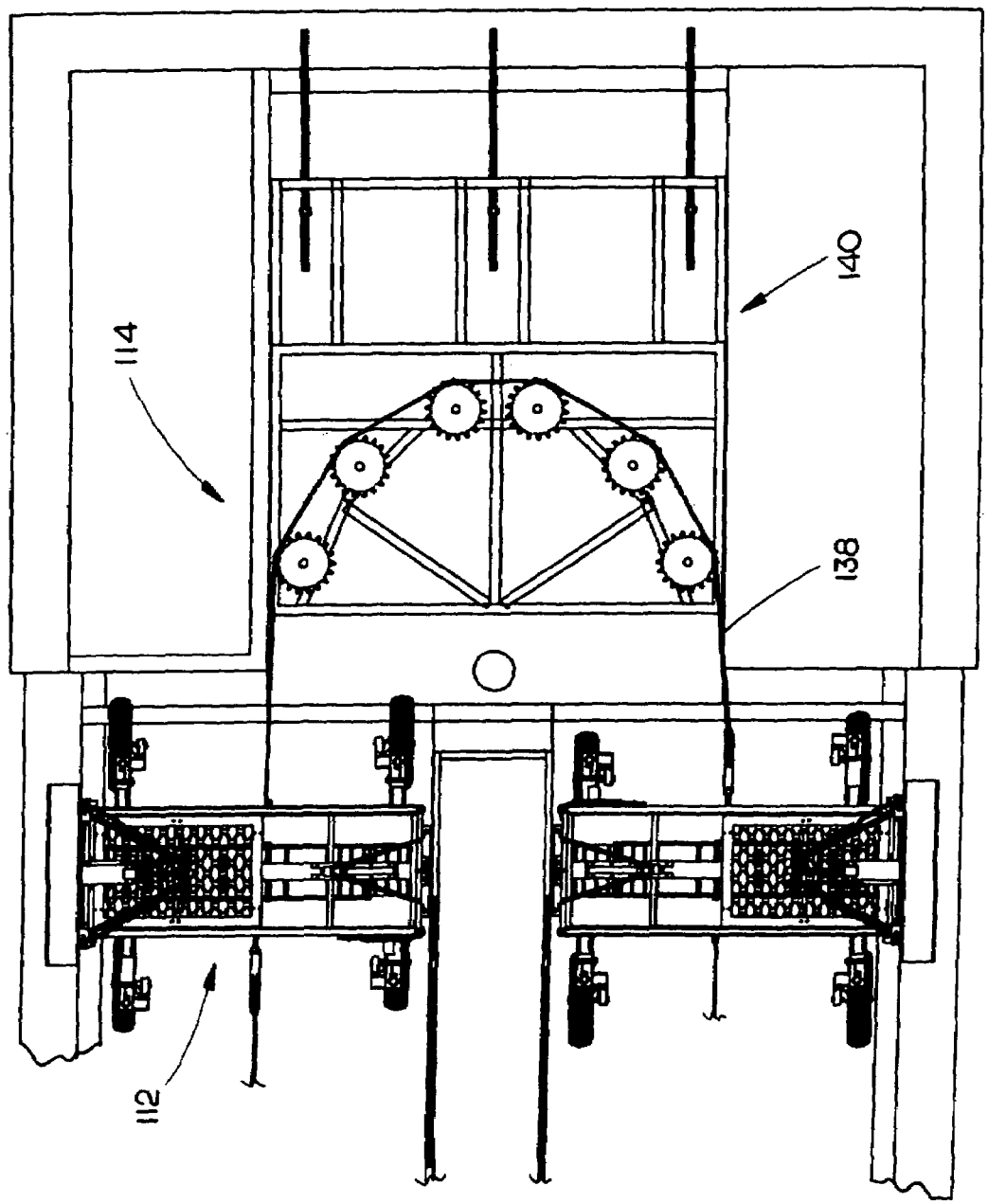
FIG. 6. is a top plan view of the trolley system illustrated in FIG. 5.

In further exemplary embodiments, as illustrated in FIG. 6, the trolley system 106 includes a conveyor system 114. The conveyor system 114 includes a continuous loop of chain or cable 138 located on a structural track and a controller for communicating with the computer network system and controlling trolley car movement along the chain or cable. The structural track includes a drive end 140 that allows the trolley car 112 to turn a corner. Such design allows the trolley system 106 to move in a continuous loop and may provide access to more pen areas compared to a single length of straight structural track. For example, in an embodiment, use of the drive end may allow access to twice as many pen areas.

Figure 11:
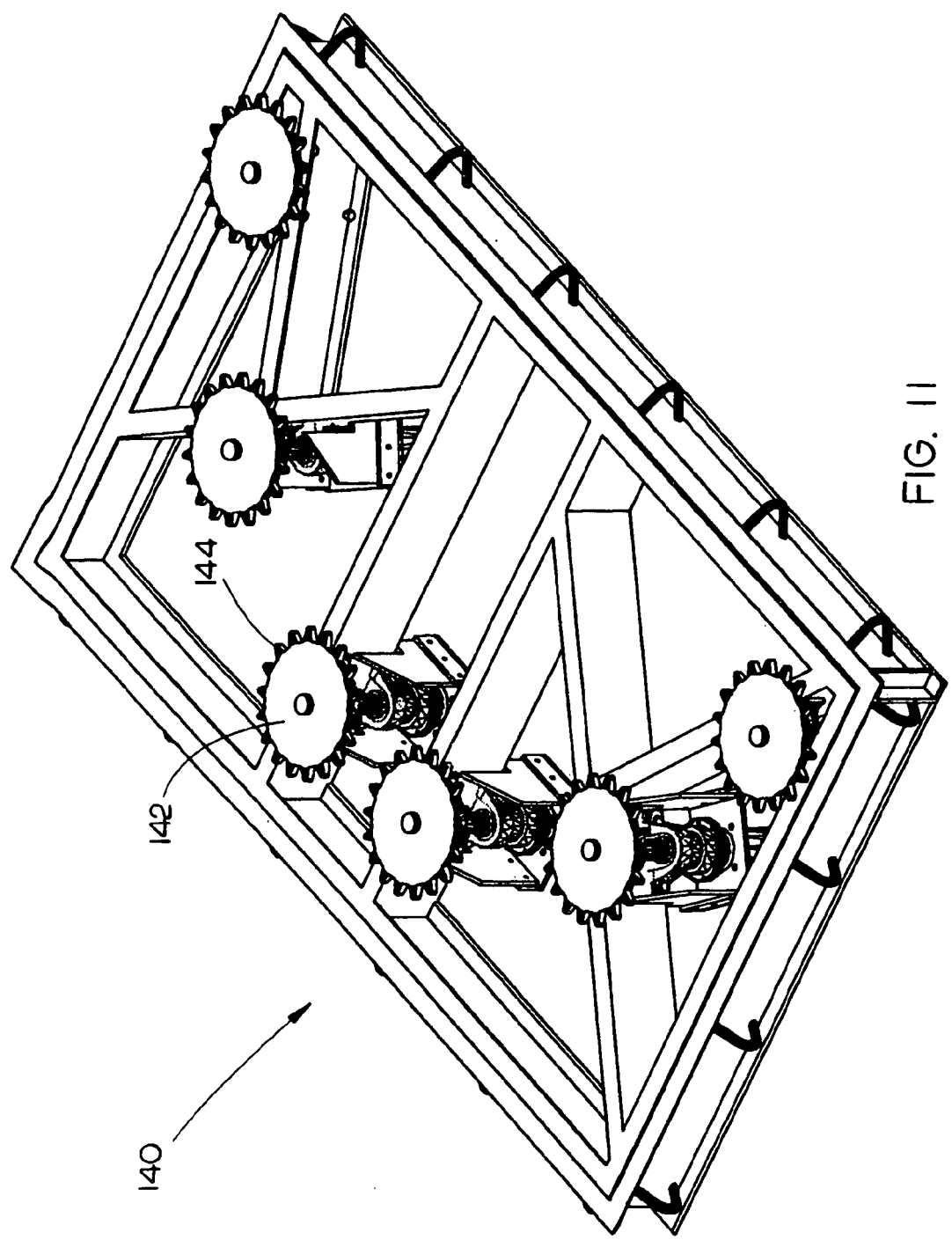
FIG. 11 is an isometric view of a drive end in accordance with the present invention, wherein the drive end is a component of the conveyor system as illustrated in FIG. 6 and allows a trolley car to turn a corner.
Figure 12:
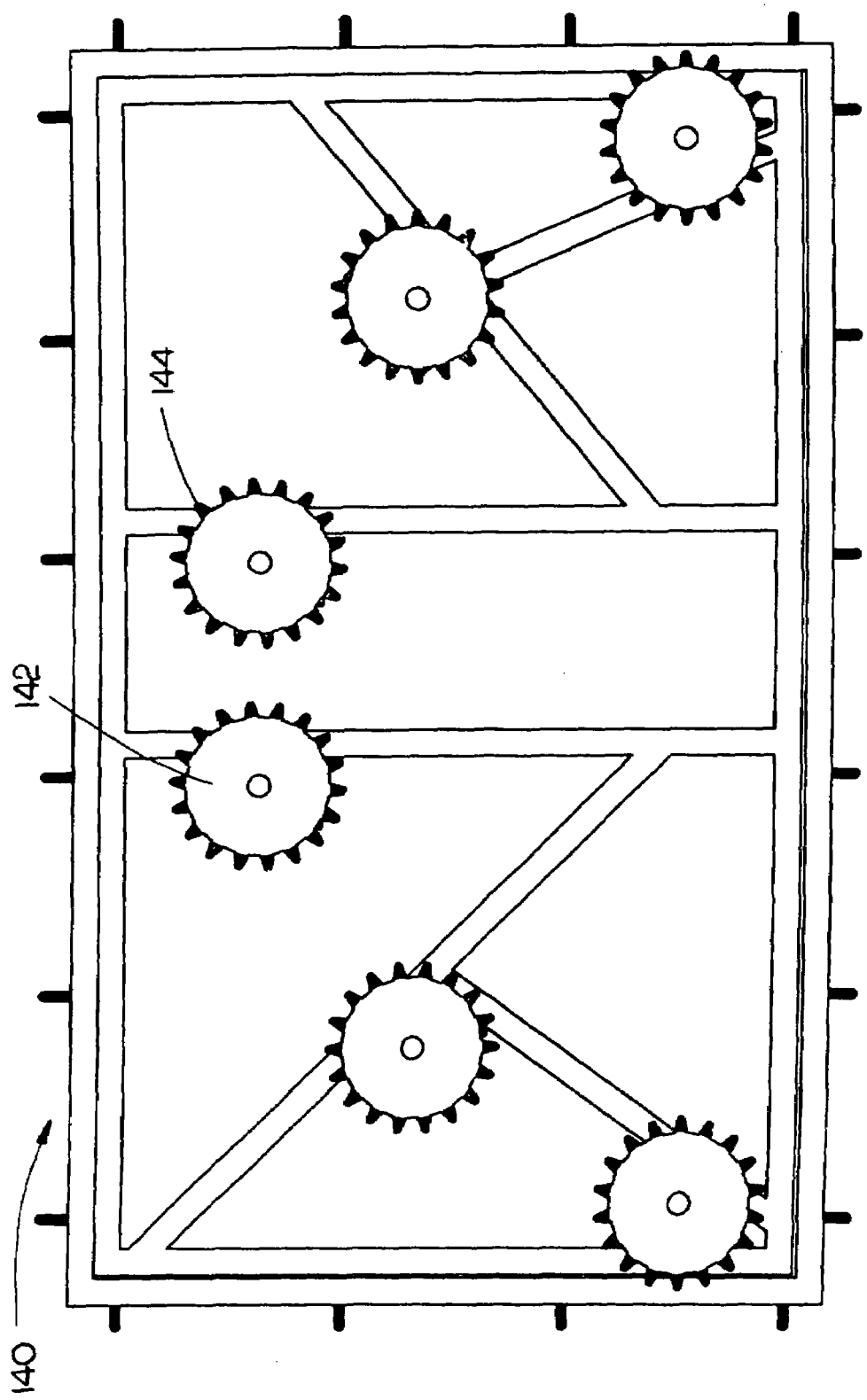
FIG. 12 is a top plan view of the drive end illustrated in FIG. 11.
Figure 13:
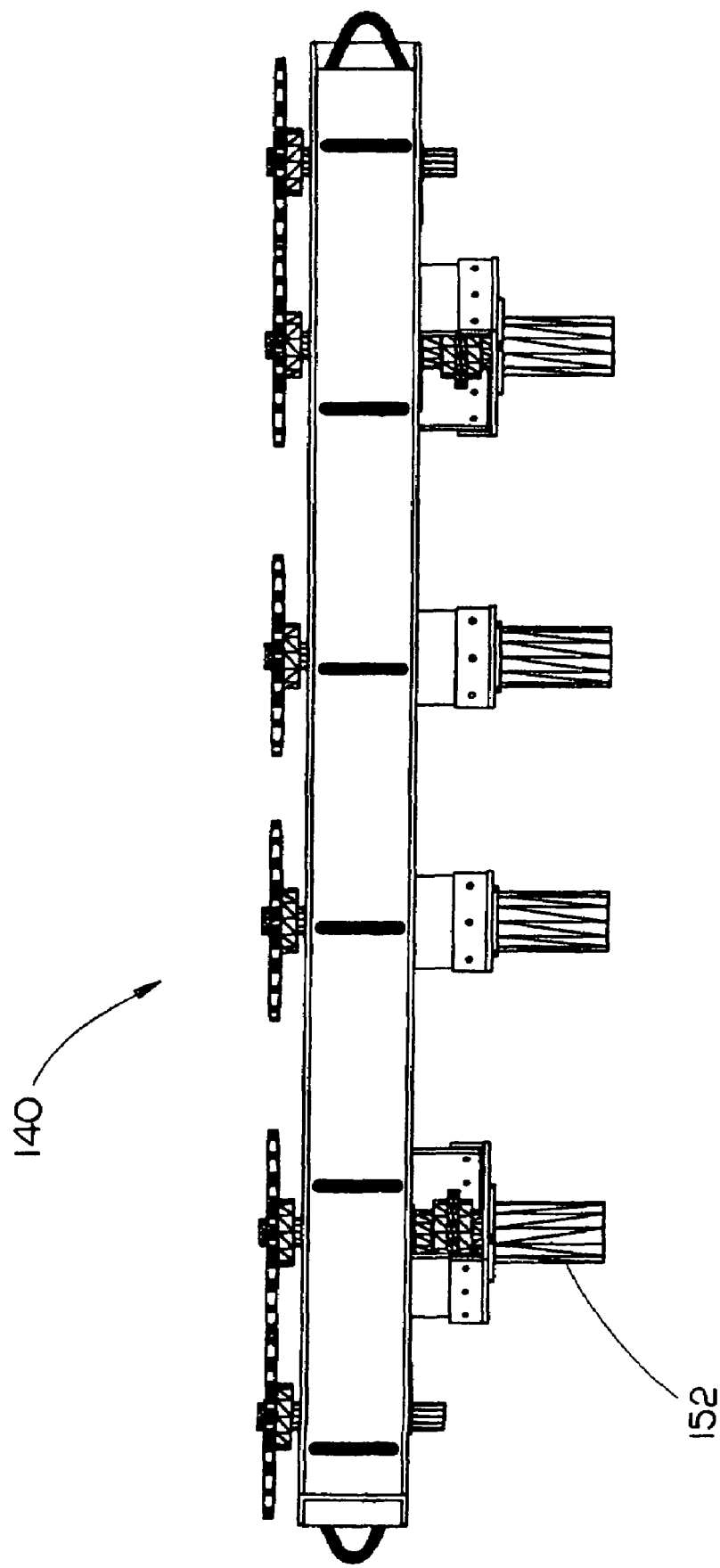
FIG. 13 is a side view of the drive end illustrated in FIGS. 11 and 12.
Figure 14:
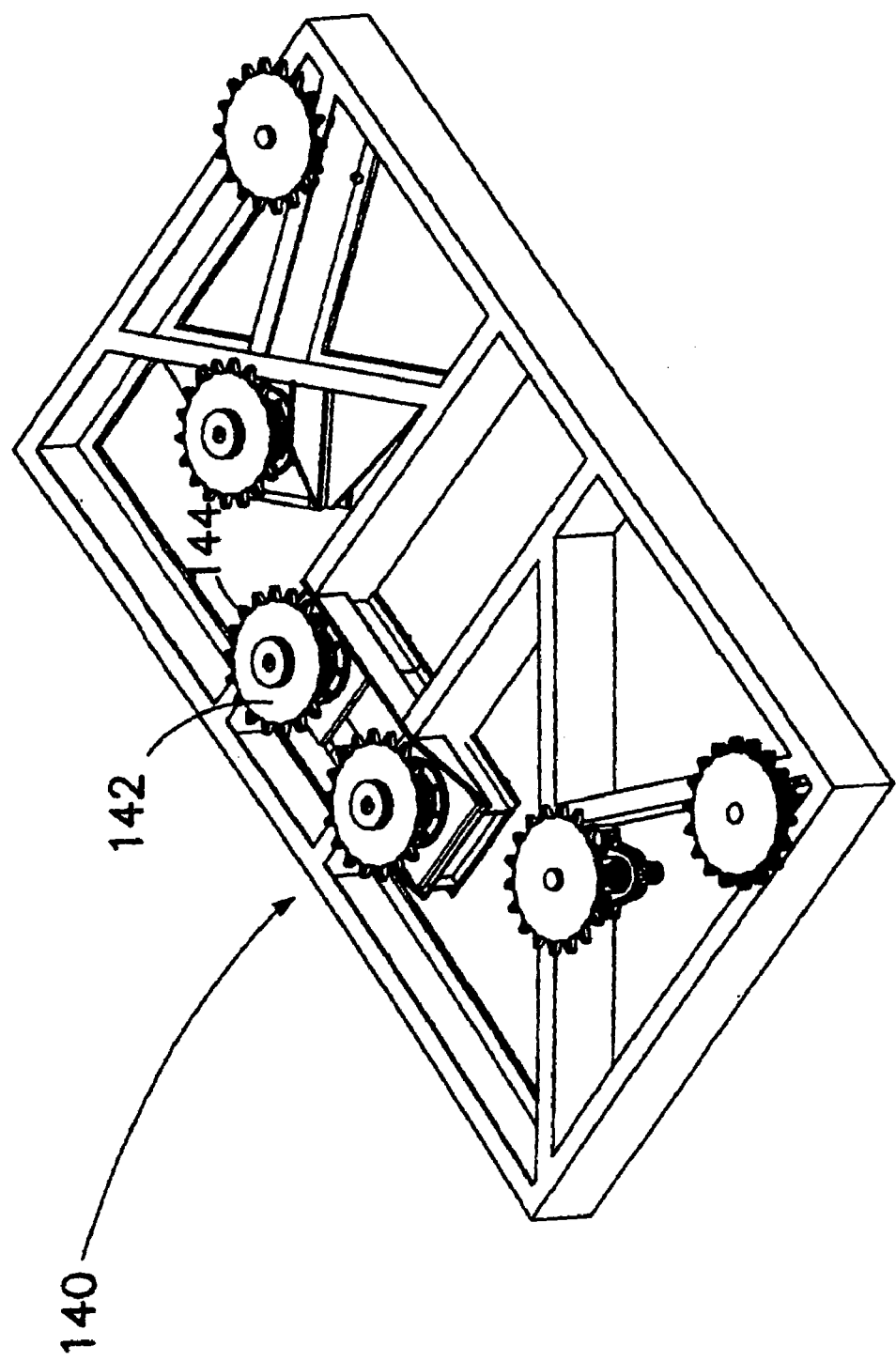
FIG. 14 is an isometric view of an additional drive end in accordance with the present invention, wherein the drive end is a component of the conveyor system as illustrated in FIG. 6 and allows a trolley car to turn a corner.
Figure 15:
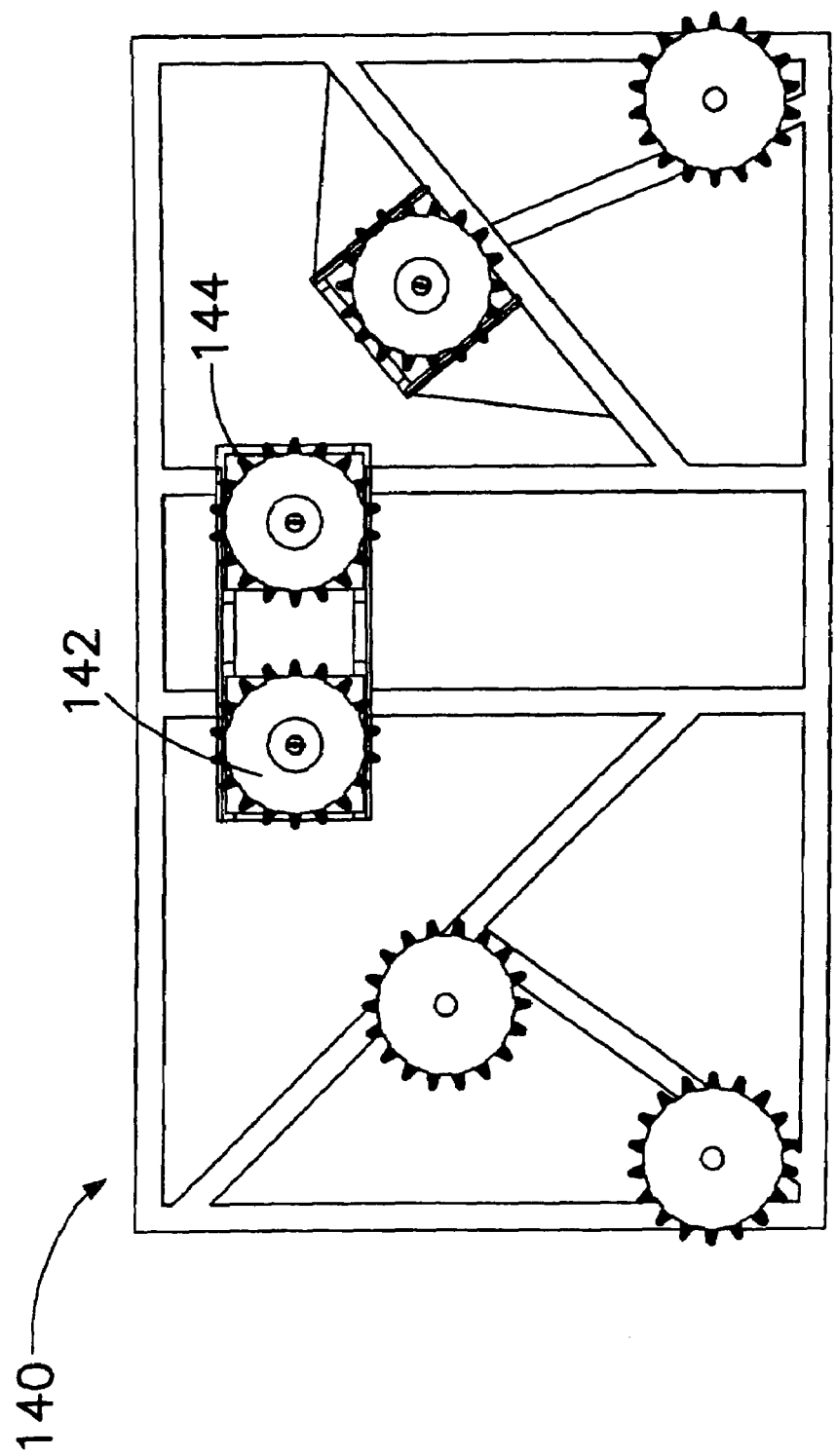
FIG. 15 is a top plan view of the drive end illustrated in FIG. 14.
Figure 16:
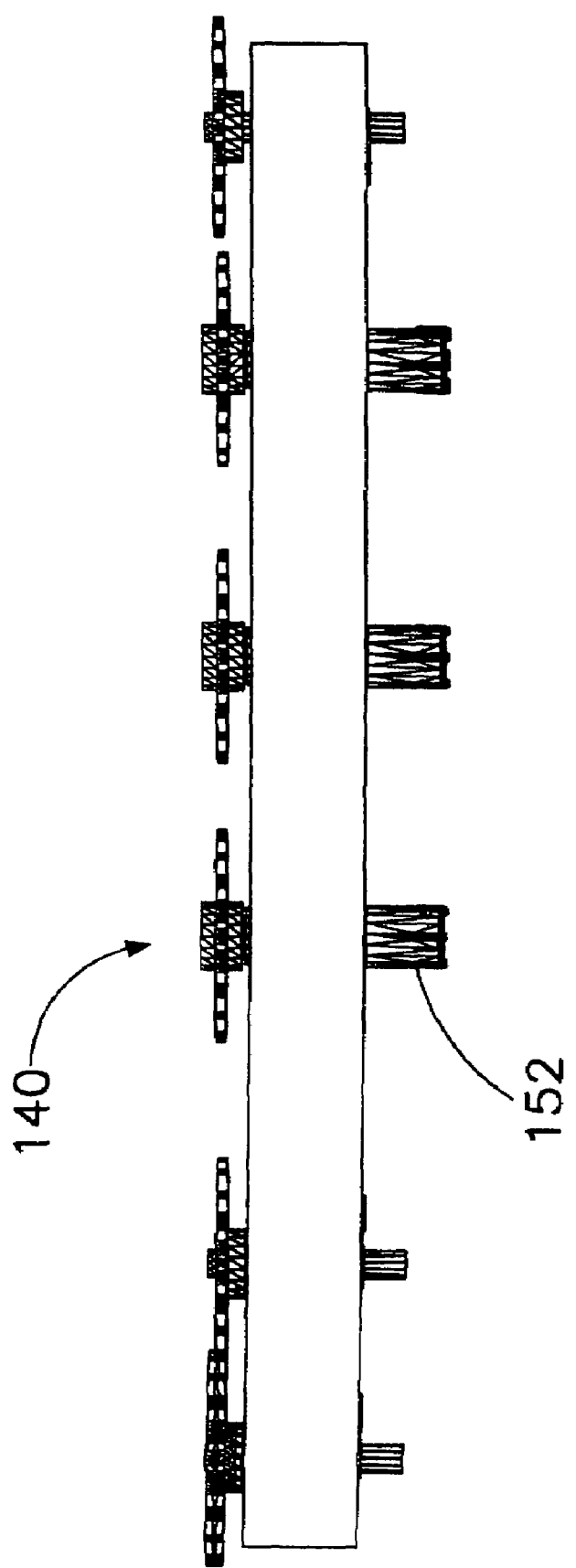
FIG. 16 is a side view of the drive end illustrated in FIGS. 11 and 12.

Referring specifically to FIGS. 11 through 16, an exemplary drive end 140 includes a plurality of sprockets 142 including teeth 144 which mesh into the continuous loop of chain or cable 138 located on the structural track. In one exemplary embodiment, six sprockets 142 with teeth 144 are included within the drive end 140. Further, as illustrated in FIGS. 11 and 13, the four inner sprockets are coupled to individual motors 152 whereas the two most outer sprockets are not. It is contemplated that various types of motors including hydrostatic and hydraulic motors may be employed to provide rotational torque to the drive end 140. Further, the number of motors may vary. For example, in an exemplary embodiment, three drive motors are included within the drive end 140 (See FIGS. 14 through 16). Alternatively, as illustrated in FIGS. 11 through 13, the drive end 140 may include four drive motors driven by a hydraulic motor. In further exemplary embodiments, a planetary gear system is used in combination with the motor (e.g., a hydrostatic motor) in order to increase the amount of torque provided by such motor. Such additional torque becomes important in adverse weather conditions (e.g., cold temperatures may affect the ability to accurately control the speed of the hydraulic motors). In an additional embodiment, a sensor may be included within the drive end 140 which counts teeth 144 allowing the position of the trolley car 112 to be carefully monitored.

Figure 10:
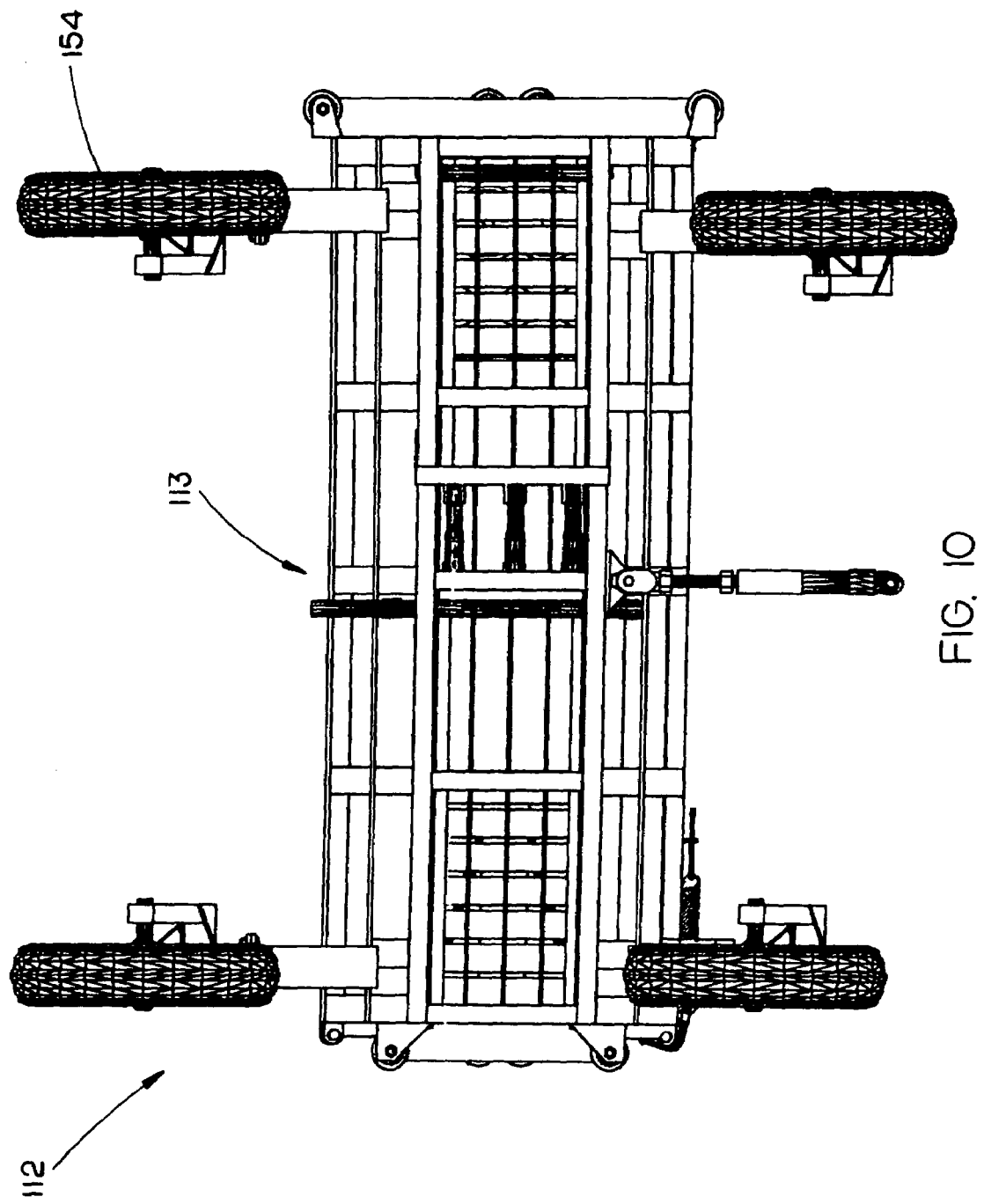
FIG. 10 is a bottom view of the trolley illustrated in FIGS. 7 through 9.

In the exemplary embodiment, the structural track is set on the floor of the sorting facility. In an alternative embodiment, the track may be operated overhead. Regardless of the location of the track, the plurality of trolley cars 112 are specifically spaced and then coupled to the track via a mechanical coupling device 146. As illustrated in FIG. 7, the mechanical coupling device 146 includes a gear 148 with teeth that engage the continuous loop of chain or cable 138. The gear 148 is then coupled to the side support of a trolley car 112 by a hitch 150. It is contemplated that the hitch 150 may be formed of 150 may include steel, aluminum, and the like. Suitable fasteners for the fastening of the hitch 150 to the side support may include nuts, bolts, screws, and the like. In further exemplary embodiments, a plurality of rollers are coupled to the side surfaces and are arranged to provide additional support to the trolley car 112 as it travels along the conveyor system 114. For example, as illustrated in FIG. 10, four wheels 154 may be coupled to the trolley car 112.

Figure 17:
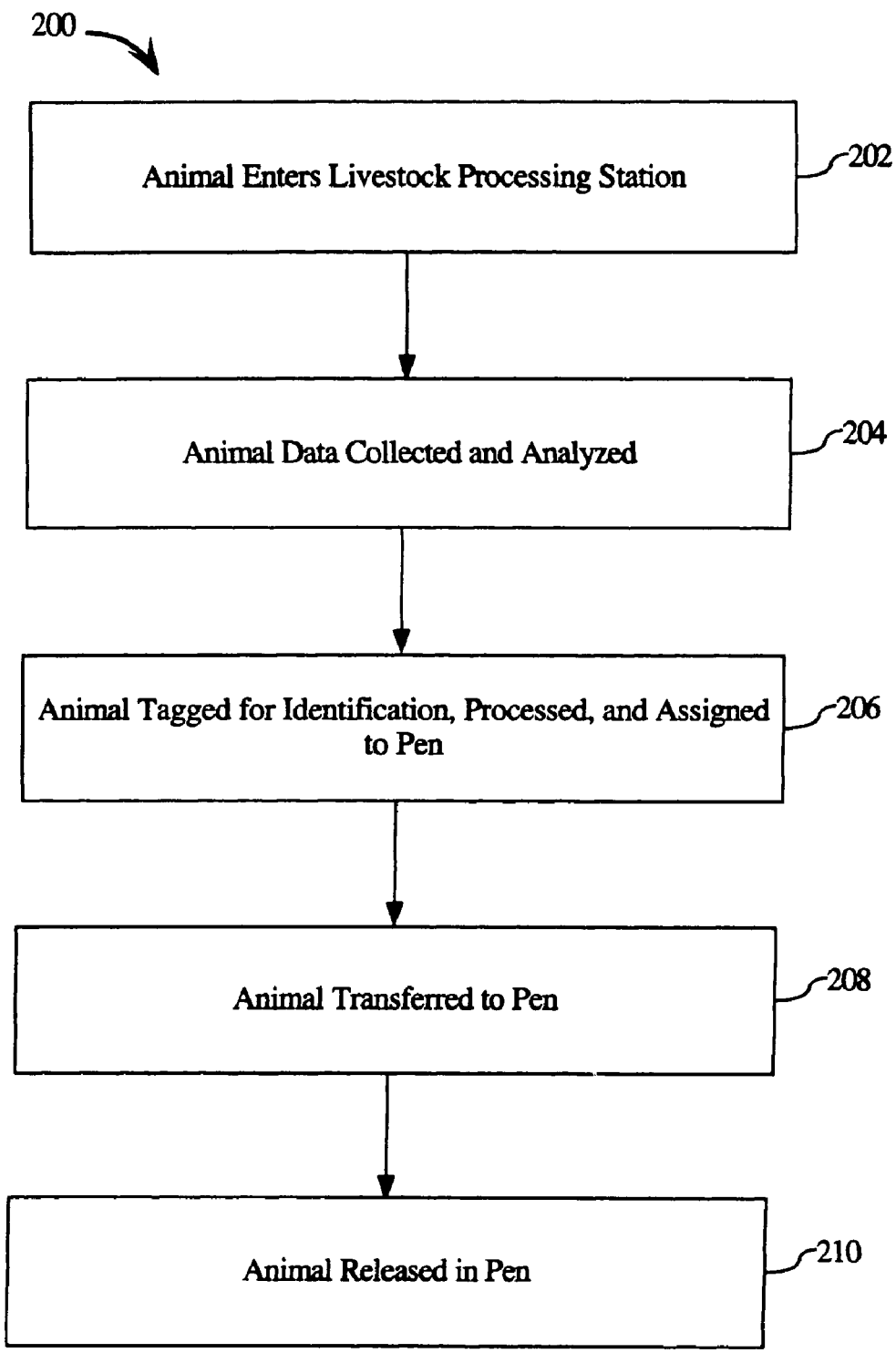
FIG. 17 is a flow chart depicting a method of sorting livestock in accordance with the present invention.

In addition to the system for sorting of livestock, the present invention discloses a method for managing livestock flow. As illustrated in FIG. 17, a method for managing livestock flow 200 includes an individual animal beginning the sorting process by entering the livestock processing station, 202. As described above, such station confines the individual animal, allowing individual livestock data to be collected and analyzed, 204. In order to monitor desired animal characteristics over a specific time interval, animal specific identification devices are employed. In one embodiment, a tag with an animal specific tracking number or a barcode which may be easily read by a barcode scanning device is utilized to identify and track individual animals. In use, the identification device is removed from the animal (e.g. from the animal's ear) while the animal in confined within the chute. The number as well as individual animal data is then entered into a tracking system and individual animal data is analyzed. After data analyzation, a new tag with an identification number is placed on the animal to continue monitoring 206. Those of skill in the art will appreciate that one tag may also be used for the same animal and data specific to that animal may be stored with tag identification data or the like.

In one embodiment, the tracking system consists of a logbook in which manual entries are made. In an alternative embodiment, a computer network is utilized to keep track of and process animal data. In such an embodiment, a first computer is employed at the site of animal processing (e.g. livestock processing station) for entering individual animal data.

Following data input, the first computer system transmits the information via a network to a second computer system. In an exemplary embodiment, the second computer system is the main computer system which processes individual animal data to determine animal destination. In use, a "GO" button on the first computer system is pressed to indicate that data entry is complete and the animal is ready to proceed through the facility. Following such indication, the information is transmitted via the network to the second computer system where the data is processed and analyzed and pen assignment determined.

Pen assignment may be determined by user needs. For example, in one embodiment, a user may desire to sort animals by factors indicative of market ready cattle. Thus, factors such as weight, breed, cattle type, month purchased, and purchase weight may be considered. Alternatively, animals may be sorted based upon criteria indicative of quality grade, yield grade, or tenderness of the meat. Thus, factors such as hide color, thickness, breed, cattle type, and sickness history may be monitored. Additional factors including animal temperature, producer tag, flesh score, frame score, ultrasound score, and video imaging score may also be monitored. Moreover, it is contemplated that the aforementioned method may be utilized to monitor animals during research trials. For instance, a feedlot or producer may wish to randomize the cattle for purposes of a research trial.

After determining the appropriate pen and tag number, such information is transmitted from the second computer to the first computer (e.g. the computer located at the livestock processing station). In one embodiment, the animal is retagged, appropriate reagents administered and pen re-assignments made while the animal is confined in a first chute. In an alternative embodiment, the animal is released from the first chute and transferred to a second chute prior to the retagging, drug administration and pen reassignment.

After the animal has been retagged, appropriate drugs administrated, and other desired processing acts performed, the animal is ready to be transferred to the appropriate pen 208. In an exemplary embodiment, an animal is transferred to the appropriate pen by use of the trolley system 106 as described above. In such embodiment, the animal passes through a trolley car located in a home position, through a transition area and into another trolley car in a first position (the first position the trolley is located in front of a first gate which leads to a first pen). If the animal is to be released into the first pen via the first gate, the first gate will be opened and the animal will proceed through the trolley in the first position without any movement along the conveyor system. If the animal is to proceed to any other pen number, the doors of the trolley remain closed and the animal continues to ride in the trolley on the conveyor system 114 until arriving at the appropriate gate/pen. Once at the appropriate gate/pen, the gate and trolley doors will open and the animal will be released 210.

It is believed that the present invention and many of its attendant advantages will be understood by the foregoing description, and it will be apparent that various changes may be made without departing from the scope and spirit of the invention or without sacrificing all of its material advantages. The form herein before described being merely an explanatory embodiment thereof, it is the intention of the following claims to encompass and include such changes.

Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

What is claimed:

1. A trolley assembly for moving livestock within a sorting facility, comprising:
   a support surface constructed to support and transport livestock;
   a plurality of side supports extending from the support surface constructed to confine the livestock within the area defined by the support surface, the plurality of side supports including side supports configured to open and shut;
   at least one mechanical connector coupled to the side supports capable of opening and shutting for controlling the opening and shutting of such side supports;
   a mechanical coupling device coupled to the side supports configured to attach the supports to a conveyor assembly; and
   a plurality of rollers coupled to the side surface arranged to provide additional support to the support surface,
   wherein such structures construct a trolley assembly configured to move livestock on a conveyor assembly within a sorting facility, and
   wherein the mechanical coupling device configured to attach the supports to a conveyor assembly includes a gear, a hitch, and a plurality of fasteners.

2. The trolley assembly of claim 1, further comprising a top assembly coupled to the side supports.

3. The trolley assembly of claim 2, wherein the top assembly includes wire mesh extending at least half the length of such assembly.

* * * * *